United States Patent

Sheth et al.

[15] 3,671,633

[45] June 20, 1972

[54] PROCESS FOR TABLETTING ACETAZOLAMIDE

[72] Inventors: Prabhakar Ranchhordas Sheth, Nanuet, N.Y.; James Henry Wiley, Westwood, N.J.

[73] Assignee: American Cyanamid Company, Stamford, Conn.

[22] Filed: May 10, 1971

[21] Appl. No.: 141,974

Related U.S. Application Data

[63] Continuation-in-part of Ser. No. 783,765, Dec. 13, 1968, abandoned.

[52] U.S. Cl. ............................................. 424/273, 264/122
[51] Int. Cl. ............................................................ A61j 3/10
[58] Field of Search ......................... 264/122; 424/273, 358

[56] References Cited

UNITED STATES PATENTS

| | | | |
|---|---|---|---|
| 2,554,816 | 5/1951 | Clapp et al. | 260/294.8 |
| 2,744,907 | 5/1956 | Young | 260/302 |
| 2,951,791 | 9/1960 | Stearns | 424/227 |
| 3,134,719 | 5/1964 | Sheth et al. | 424/358 X |
| 3,145,146 | 8/1964 | Lieberman et al. | 424/37 X |
| 3,146,168 | 8/1964 | Battista | 424/360 X |
| 3,200,039 | 8/1965 | Thompson | 424/358 X |
| 3,341,415 | 9/1967 | Scott | 424/361 X |
| 3,344,030 | 9/1967 | Stevens et al. | 424/362 X |
| 3,384,546 | 5/1968 | Palermo | 424/358 X |
| 3,490,742 | 1/1970 | Nichols et al. | 424/361 X |

*Primary Examiner*—Shep K. Rose
*Attorney*—Norton S. Johnson

[57] ABSTRACT

A process for producing pharmaceutically acceptable tables of acetazolamide which comprises compressing a mixture containing a binder and a mixture of acetazolamide crystals. The mixture of acetazolamide crystals is characterized by a binodal size distribution and is obtained by adding acetazolamide seed crystals to a saturated solution of acetazolamide while cooling and agitating the mixture of seed crystals and solution.

6 Claims, No Drawings

PROCESS FOR TABLETTING ACETAZOLAMIDE

This application is a continuation-in-part of our copending application, Ser. No. 783,765, filed Dec. 13, 1968 now abandoned.

This invention relates to a process for tabletting 2-acetylamino-1,3,4-thiadiazole-5-sulfonamide. More particularly, the present invention relates to a method for tabletting 2-acetylamino-1,3,4-thiadiazole-5-sulfonamide by compressing a mixture of crystals having a binodal particle size distribution within the range of 200 to 1,500 microns.

Present processes for producing 2-acetylamino-1,3,4-thiadiazole-5-sulfonamide, hereinafter referred to as "acetazolamide"d, involve recovery techniques whereby the acetazolamide is crystallized from solutions. The crystalline products obtained thereby are characterized by mononodal size distribution. Depending upon the particular process employed for crystallizing the acetazolamide from solution, the particles may be either small or large.

Granulation or slugging are employed to obtain acetazolamide mixtures containing both relatively large and relatively small size granules. When the desired size distribution of acetazolamide granules is attained, the mixtures can be compressed into tablets which are pharmaceutically acceptable and which have the desired degree of hardness and resistance to chipping. However, granulation or slugging are undesirable techniques since they involve additional equipment and process time to effect blending, milling, drying, etc. Each of these steps results in increased cost to the manufacturer and the consumer.

It is an object of the present invention to provide a process for tableting acetazolamide to produce commercially acceptable tablets. It is a further object of the present invention to provide a process for tabletting crystalline acetazolamide without employing either a granulation or a slugging step. Further objects of the present invention will become evident from the following detailed description.

It has now been discovered that crystalline acetazolamide products having particle binodal size distribution within the range of 200 to about 1,500 microns can be directly tableted without undergoing prior granulation or slugging to obtain commercially acceptable tablets having uniform hardness and appearance. The acetazolamide useful in accordance with the present invention can be obtained by seeding a saturated solution of acetazolamide with acetazolamide crystals while cooling and agitating the solution. The acetazolamide crystals thus obtained are mixed with a physiologically acceptable binder and compressed to form pharmaceutically acceptable tablets.

The type of acetazolamide crystals employed to make the saturated solution of acetazolamide is not critical. The saturated solution is seeded with from about 0.25 to about 10.0 percent, preferably from about 0.5 to about 5.0 percent by weight of seed crystals based on the weight of the acetazolamide in solution and is cooled while maintaining agitation. The seed crystals useful to initiate crystallization are conveniently prepared by presently available crystallization processes such as is described in U.S. Pat. Nos. 2,554,816, 2,759,947 and 2,823,208. The average size of the seed crystals is in a range of between about 60 microns and about 1,000 microns. It is to be understood some particles may be either smaller or larger, but at least about 90 percent should fall within the stated range. The seed crystals are prepared by seeding a saturated solution of acetazolamide with acetazolamide crystals having a size in the range of between 60 microns and 1,000 microns. During addition of the seed crystals, the solution is cooled without agitation to obtain acetazolamide crystals which are recovered from the mother liquor.

The rate of cooling of the saturated solution can vary within a wide range. It should not be so fast as to produce undesirably small crystals nor so slow as to require inordinate periods of time to recover the crystal product. Desirable rates of cooling which can be employed to produce the crystal product of this invention are within the range of about 0.2°C./minute and about 1°C./minute.

As stated above, the saturated solution must be moderately agitated to produce mixed crystals having a binodal size distribution. Excessive agitation causes the production of undesirably small crystals having an average particle size of less than 50 microns, while insufficient agitation causes the production of undesirably large crystals having an average particle size greater than about 2,500 microns. Crystalline products having the desired size distribution are obtained when employing an agitation rate within the range of about 60 to about 150 R.P.M.

The crystalline acetazolamide having a binodal size distribution is mixed with a physiologically acceptable binder in the desired proportions and then compressed to form tablets. Suitable binders which can be employed for admixture with the acetazolamide are microcrystalline cellulose, sorbitol, spray dried lactose, dibasic calcium phosphate, modified mannitol, modified starch, etc. An example of a modified starch is "Sta-Rx 1500" available from A.E. Staley Manufacturing Co., Decatur, Ill. The binder is employed in amounts of between about 30 and about 80 weight percent, preferably between about 50 and about 55 weight percent, based upon the weight of binder-acetazolamide mixture. The mixture to be tabletized can also contain other materials normally employed in tabletizing processes. Thus lubricants such as magnesium stearate, steric acid, talc, etc. or disintegrants such as starch, alginic acid, sodium alginate, etc., can be employed. The acetazolamide should comprise at least about 47 percent of the mixture. The mixtures are compressed in any manner well known in the art such as with a rotary tablet press or a single press.

Suitable solvents to obtain saturated solutions of acetazolamide which can be employed to produce acetazolamide crystals characterized by a binodal size distribution, are those which are unreactive therewith and can dissolve substantial concentrations of acetazolamide. Included are water, ethyl acetate, ethanol, ethylene chloride, petroleum ether, acetone and aqueous acetone. The saturated solutions contain acetazolamide in an amount sufficient to saturate the solvent at or near the solvent boiling point. When employing water, the preferred crystallizing medium, the amount of acetazolamide in a solution at the boiling point, is about 1 to 3 parts per hundred parts by weight of water.

The following examples illustrate the process of the present invention and are not intended to limit the same.

EXAMPLE 1

Acetazolamide Crystals Having a Binodal Size Distribution

A. Preparation of Acetazolamide seed crystals

To 130 parts of monohydrazine sulfate ($NH_2NH_2 \cdot H_2SO_4$ 1.0 mole) in about 100 parts of water is added about 30 parts of sodium hydroxide, the amount of caustic being insufficient to complete the conversion of monohydrazine sulfate to dihydrazine sulfate ($2NH_2NH_2 \cdot H_2SO_4$). A catalytic amount (4 parts) of hypophosphorous acid is added, followed by the addition of 152 parts (2.0 moles) of ammonium thiocyanate as a 75 percent aqueous solution. The addition is made with stirring and at a temperature of 90° to 100° C. The reaction mixture is heated to reflux (100° to 110° C.) and maintained at reflux for about 1 hour. The reaction mixture is then allowed to cool to 90° to 100° C. and about 60 parts of concentrated sulfuric acid (98 to 100 percent) is added. The reaction mixture is again heated to reflux and maintained at reflux for about 5 hours. The intermediate, N,N'-bis(thiocarbamyl)-hydrazine is separated and washed.

To a solution 600 parts of glacial acetic acid, 400 parts of water, 390 parts of concentrated hydrochloric acid and 20 parts of 50 percent hypophosphorous acid, is added 440 parts of the N,N'-bis(thiocarbamyl)-hydrazine obtained above. The mixture is heated to reflux and held for 8 hours. After cooling to about 20° to 25° C., crystals of 2-acetylamino-5-mercapto-1,3,4-thiadiazole are removed by filtration and washed.

To 4,000 parts of 18 percent hydrochloric acid is added 460 parts of 2-acetylamino-5-mercapto-1,3,4-thiadiazole obtained above. The mixture is stirred in a cooling bath while chlorine is introduced through a capillary tube until there is a completion of chlorination completed satisfactorily using ethyl acetate. About 5 hours are required. The temperature during the chlorination is maintained below 10° C. The slurry is filtered and washed with cold water.

The 2-acetylamino-1,3,4-thiadiazole-5-sulfonamide is obtained by the addition of hydrochloric acid, cooling, and isolation by filtration.

The material obtained is in the form of a mixture of minute crystals having a mononodal size distribution of 5 to $10\mu$ length.

To 1,000 parts of water at 95° C. is added 21.0 parts of the acetazolamide crystals obtained as described above while the mixture is being stirred to form a saturated solution of acetazolamide. When solution is complete, the stirring is stopped and crystallization allowed to proceed by air-cooling in an evaporation dish. The resulting crystals have an average particle size of $800\mu$ and a typical mononodal size distribution. These crystals are used as seeds in the crystallization processes set forth below.

B. Preparation of Acetazolamide of binodal size distribution

To 1,000 parts of water at 95° C., is added, with stirring, 21.0 parts of acetazolamide crystals. The resultant saturated solution of acetazolamide is allowed to cool to about 90° C. at which point, 0.318 parts of the seed crystals prepared in Part A are added. The solution is allowed to cool under the influence of the surrounding air while maintaining moderate stirring. After crystallization is essentially complete, the crystals are separated from the mother liquor by centrifugation and dried at ambient conditions. The crystal mixture obtained shows a binodal size distribution as indicated in Table I.

TABLE I

Binodal Particle Size Distribution

| Particle Size ($\mu$) | % of Total Crystals |
|---|---|
| 100 | 3.6 |
| 100–200 | 5.4 |
| 200–300 | 12.6 |
| 300–400 | 9.7 |
| 400–500 | 8.2 |
| 500–600 | 6.5 |
| 600–700 | 7.1 |
| 700–800 | 8.7 |
| 800–900 | 9.4 |
| 900–1000 | 10.9 |
| 1000–1500 | 14.7 |
| 1500–2000 | 3.2 |
| 2000 | 0.0 |

A plot of the percentage of particles against the particle size shows distribution peaks at an average size of $200\mu$ and an average size of $1,300\mu$.

EXAMPLE 2

An aqueous saturated solution of acetazolamide is prepared by the procedure of Part B of Example 1. To the saturated solution is added 1 ½ weight percent (based upon the acetazolamide in solution) of seed crystals prepared in Part A of Example 1. The seeded solution is agitated and cooled from about 90° C. to room temperature. Crystals of acetazolamide characterized by a binodal size distribution are recovered from the mother liquor. These crystals without prior granulation or slugging are blended with 10–15 percent by weight microcrystalline cellulose, 1 percent magnesium stearate, 5 percent corn starch, 2 percent alginic acid and 35 percent dibasic calcium phosphate and the resultant mixture is directly compressed into tablets by use of a Stokes $RBB_2$ Tablet Machine. The tablets prepared in this manner have a disintegration time between about 1 and 10 minutes which is well within the limitations of pharmaceutical quality. All of the tablets are of a hardness of between about 7 Kg. and about 12 Kg. (Strong Cobb) and having chipping characteristics which are within pharmaceutical standards.

We claim:

1. The process for direct tabletting acetazolamide without employing either a granulation or a slugging step which comprises mixing from about 30 to about 80 weight percent of a pharmaceutically acceptable binder selected from the group consisting of microcrystalline cellulose, sorbitol, spray dried lactose, dibasic calcium phosphate, modified starch, and modified mannitol, with crystalline acetazolamide characterized by a binodal size distribution and an average particle size in the range of about 840 microns to 1,400 microns and compressing the resultant mixture to form tablets.

2. The process of claim 1 wherein the crystalline acetazolamide is obtained by adding seed crystals of acetazolamide having a particle size in the range of 60 microns to 1,000 microns to a saturated solution of acetazolamide while cooling and agitating the resultant mixture to effect crystallization of the acetazolamide.

3. The process of claim 2 wherein between about 0.5 and 5.0 weight percent of seed crystals is added to the saturated solution.

4. The process of claim 1 wherein the binder is microcrystalline cellulose.

5. The process of claim 1 wherein the binder is dicalcium phosphate.

6. Tablets prepared by the process of claim 1.

* * * * *